United States Patent
Hamanaka

(10) Patent No.: US 9,665,811 B2
(45) Date of Patent: May 30, 2017

(54) PRINTING APPARATUS, PRINTING METHOD, AND NON-TRANSITORY RECORDING MEDIUM

(71) Applicant: TOSHIBA TEC KABUSHIKI KAISHA, Shinagawa-ku, Tokyo (JP)

(72) Inventor: Takahiro Hamanaka, Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/680,198

(22) Filed: Apr. 7, 2015

(65) Prior Publication Data

US 2016/0297213 A1    Oct. 13, 2016

(51) Int. Cl.
| | |
|---|---|
| *G06K 15/02* | (2006.01) |
| *G06K 15/00* | (2006.01) |
| *B41J 2/325* | (2006.01) |
| *B41J 3/407* | (2006.01) |
| *B41J 3/46* | (2006.01) |
| *B41J 2/32* | (2006.01) |

(52) U.S. Cl.
CPC ............ *G06K 15/4065* (2013.01); *B41J 2/32* (2013.01); *B41J 2/325* (2013.01); *B41J 3/4075* (2013.01); *B41J 3/46* (2013.01); *G06K 15/005* (2013.01); *G06K 15/028* (2013.01); *G06K 15/403* (2013.01); *B41J 2202/37* (2013.01)

(58) Field of Classification Search
CPC ....... G03G 15/5016; G03G 2215/0426; G03G 2215/0448; G03G 2215/047; G03G 15/50; G03G 15/502
See application file for complete search history.

(56) References Cited

U.S. PATENT DOCUMENTS

| | | | | |
|---|---|---|---|---|
| 5,781,822 A | * | 7/1998 | Nishiyama | G03G 21/00 399/1 |
| 2004/0080787 A1 | * | 4/2004 | Kakikawa | B41M 7/0009 358/1.18 |
| 2008/0055660 A1 | * | 3/2008 | Tsuzuki | H04N 1/0084 358/400 |

(Continued)

FOREIGN PATENT DOCUMENTS

| | | |
|---|---|---|
| CN | 203254782 | 10/2013 |
| CN | 203845123 | 9/2014 |

(Continued)

OTHER PUBLICATIONS

Chinese Office Action for Chinese Patent Application No. 201610207883.2 mailed on Mar. 28, 2017.

*Primary Examiner* — David Banh
(74) *Attorney, Agent, or Firm* — Amin, Turocy & Watson LLP

(57) ABSTRACT

According to one embodiment, a printing apparatus includes a conveying unit, a printing unit, a display unit, and a control unit. The conveying unit conveys a sheet. The printing unit prints an image on the sheet conveyed by the conveying unit. The display unit performs display for causing a user to select necessity of re-printing on the sheet on which the image is printed. The control unit controls, if the necessity of the re-printing of the sheet is selected, the conveying unit to back-feed the sheet and controls the printing unit to perform re-printing after the back-feed of the sheet is completed.

9 Claims, 7 Drawing Sheets

(56) References Cited

U.S. PATENT DOCUMENTS

| | | | |
|---|---|---|---|
| 2009/0250863 A1* | 10/2009 | Hirate | B65H 5/062 271/4.1 |
| 2011/0037821 A1* | 2/2011 | Brewington | B41M 7/0009 347/179 |
| 2011/0222937 A1* | 9/2011 | Yahata | G03G 15/6502 399/341 |
| 2012/0319345 A1* | 12/2012 | Asada | B41J 13/0018 271/3.2 |
| 2013/0002782 A1* | 1/2013 | Kawaguchi | G03G 15/6585 347/179 |
| 2013/0242025 A1 | 9/2013 | Yamaguchi | |
| 2014/0192126 A1* | 7/2014 | Arima | B41J 2/475 347/179 |
| 2014/0204426 A1* | 7/2014 | Levi | H04N 1/00005 358/3.26 |
| 2014/0255055 A1* | 9/2014 | Katayama | G03G 15/2039 399/69 |
| 2015/0071668 A1* | 3/2015 | Katakura | G03G 15/2046 399/69 |
| 2015/0130885 A1* | 5/2015 | Meguro | B41M 7/0009 347/179 |
| 2015/0185652 A1* | 7/2015 | Mimura | G03G 15/0131 399/27 |
| 2015/0343808 A1* | 12/2015 | Honda | B41M 7/009 347/179 |

FOREIGN PATENT DOCUMENTS

| | | |
|---|---|---|
| CN | 203974249 | 12/2014 |
| JP | 2010-221717 | 10/2010 |

\* cited by examiner

PRINTING APPARATUS, PRINTING METHOD, AND NON-TRANSITORY RECORDING MEDIUM

FIELD

Embodiments described herein relate generally to a printing apparatus, a printing method, and a non-transitory recording medium.

BACKGROUND

In a printing apparatus such as a label printer, cut paper and roll paper have been used. If the cut paper, on which an image is printed, is printed again because of, for example, a printing failure of the printing apparatus, a user has to set the sheet in a tray in the printing apparatus. However, for such work, the user needs to perform operation for opening a cover of a machine body of the printing apparatus and setting the sheet. Therefore, it is likely that labor and time of the user are required.

DETAILED DESCRIPTION

In general, according to one embodiment, a printing apparatus includes a conveying unit, a printing unit, a display unit, and a control unit. The conveying unit conveys a sheet. The printing unit prints an image on the sheet conveyed by the conveying unit. The display unit performs display for causing a user to select necessity of re-printing on the sheet on which the image is printed. The control unit controls, if the necessity of the re-printing of the sheet is selected, the conveying unit to back-feed the sheet and controls the printing unit to perform re-printing after the back-feed of the sheet is completed.

A printing apparatus in an embodiment is explained below with reference to the drawings.

Figure 1:
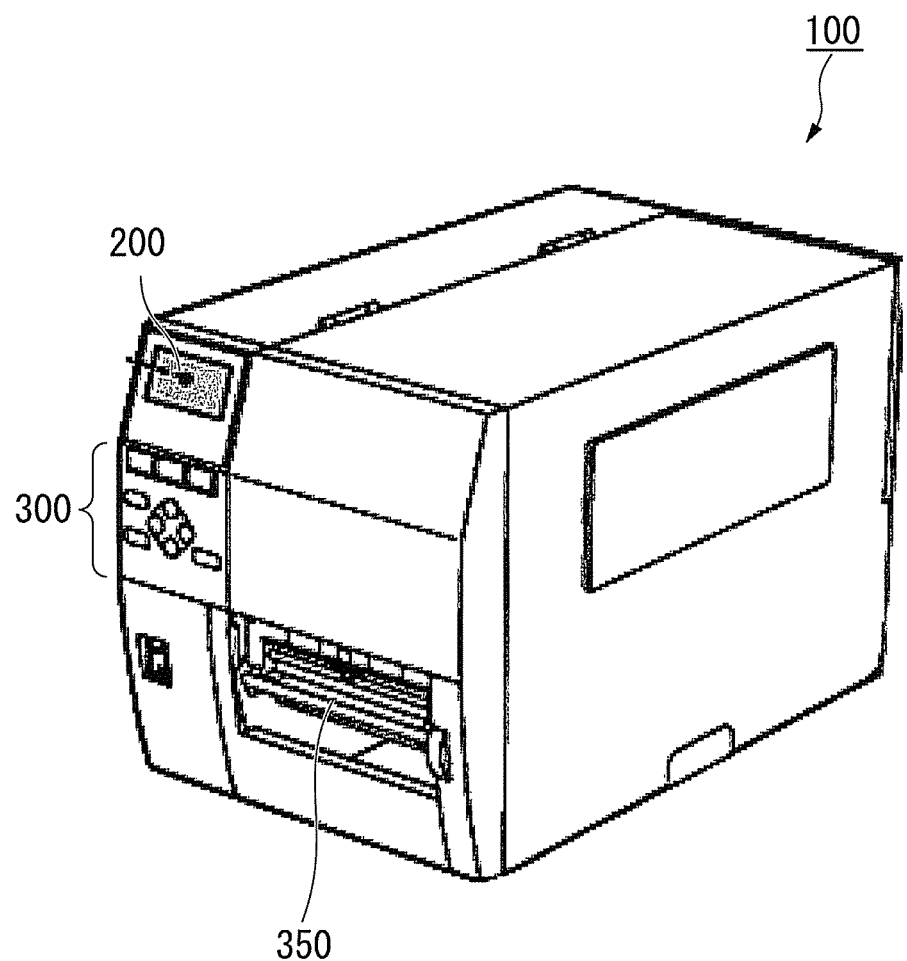
FIG. 1 is an external view of the configuration of a printing apparatus in an embodiment.

FIG. 1 is an external view of the configuration of a printing apparatus 100 in the embodiment.

The printing apparatus 100 prints a predetermined image on a sheet and issues the sheet on which the image is printed (hereinafter referred to as "printed sheet"). As an example of the sheet, in this embodiment, thermal cut paper is used. The printing apparatus 100 prints the image on the sheet using a thermo-sensitive method. The printing in this embodiment means that the printing apparatus 100 applies heat to the sheet to thereby print the image on the sheet. The printing apparatus 100 performs re-printing of the sheet after the printing according to operation by a user. Specifically, the printing apparatus 100 performs processing explained below. First, after the printing of the sheet, when the user instructs the re-printing (hereinafter referred to as "re-printing instruction"), the printing apparatus 100 pulls back the printed sheet. Processing for pulling back the printed sheet by the printing apparatus 100 is referred to as back-feed. The printing apparatus 100 back-feeds the printed sheet and applies heat to the printed sheet anew to thereby erase the image printed on the printed sheet. Thereafter, the printing apparatus 100 prints the same printing data on the sheet from which the image is erased. The printing apparatus 100 issues the printed sheet.

As shown in FIG. 1, the printing apparatus 100 includes a display unit 200, an operation unit 300, and a discharge port 350.

The display unit 200 is an image display device such as a liquid crystal display or an organic EL (Electro Luminescence) display. The display unit 200 operates as an output interface and performs display of characters and images. For example, the display unit 200 displays a selection screen. The selection screen is, for example, a screen for causing the user to select whether the re-printing is performed. The display unit 200 operates as an input interface and receives an input of an instruction from the user. For example, when the display unit 200 operates as the input interface, the display unit 200 may receive an input of information input to the operation unit 300.

The operation unit 300 is configured using an existing input device such as a button, a keyboard, or a pointing device (a mouse, a tablet, etc.). The operation unit 300 is operated by the user when the user inputs an instruction to the printing apparatus 100. For example, the operation unit 300 receives inputs of a printing instruction and a re-printing instruction for printing data.

The discharge port 350 discharges the printed sheet.

Figure 2:
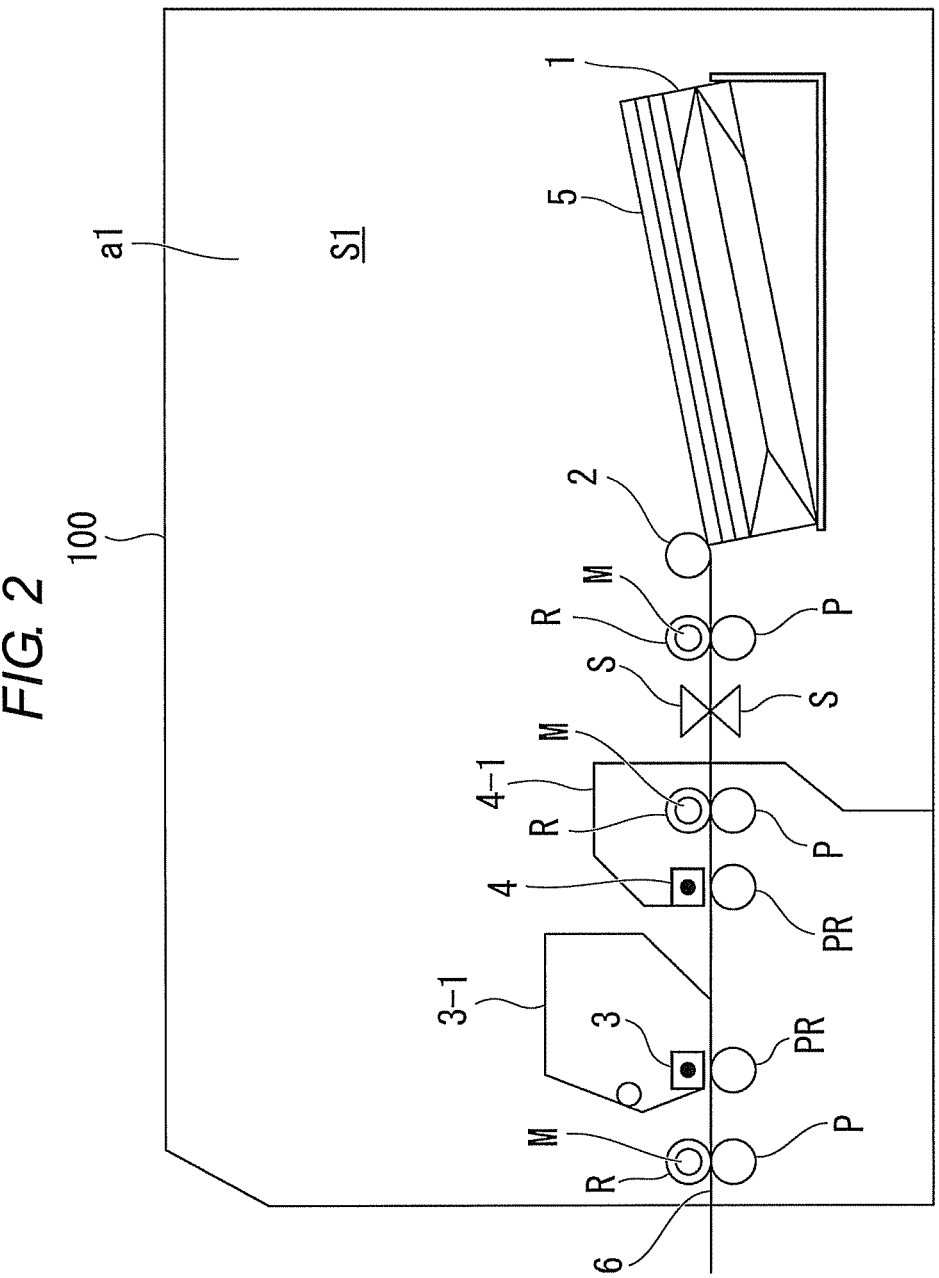
FIG. 2 is a side view showing an example of the internal configuration of the printing apparatus.
Figure 3:
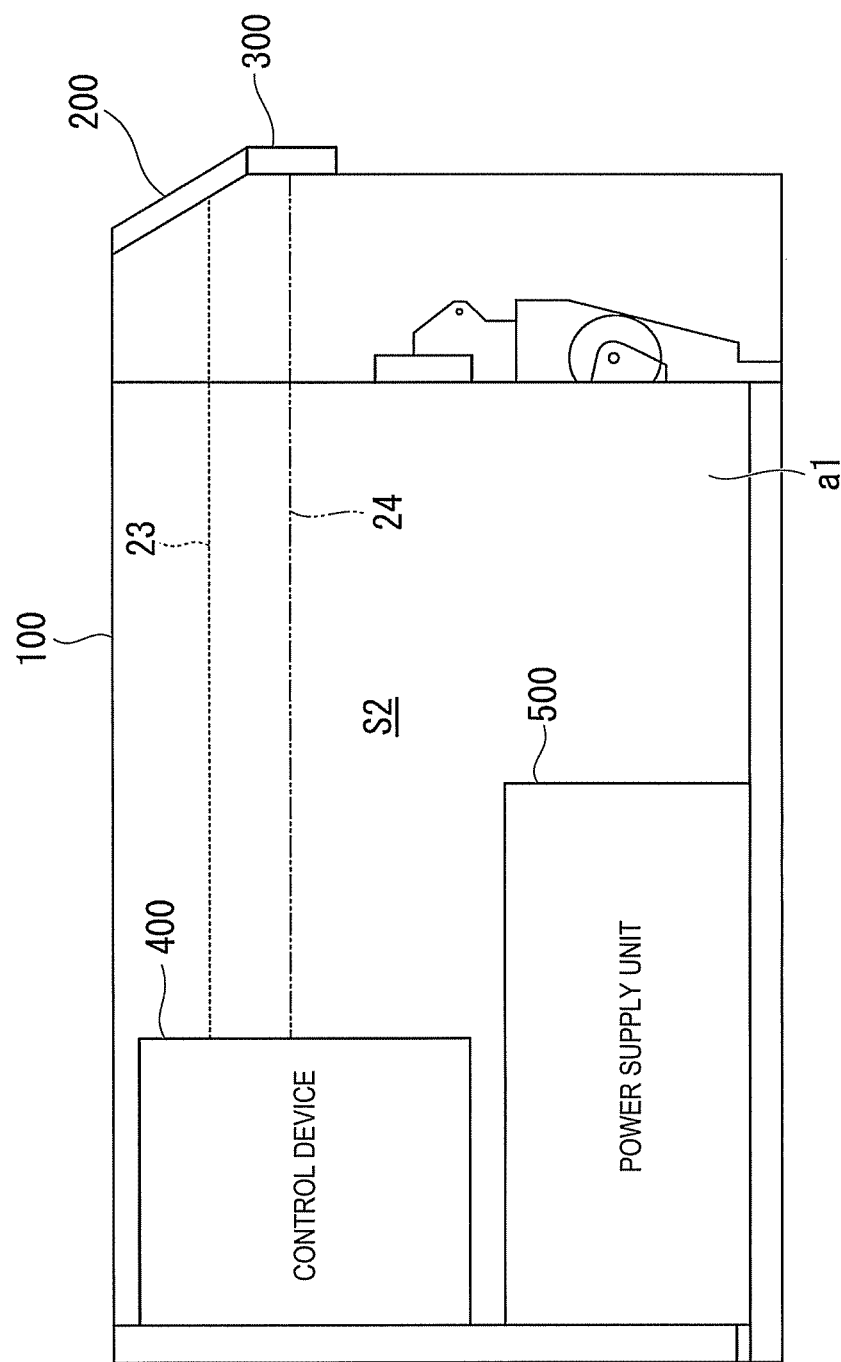
FIG. 3 is a side view showing an example of the internal configuration of the printing apparatus.

FIGS. 2 and 3 are side views showing an example of the internal configuration of the printing apparatus 100 in the embodiment. In FIGS. 2 and 3, figures of the internal configuration of the printing apparatus 100 respectively viewed from different sides are shown. As shown in FIGS. 2 and 3, the printing apparatus 100 includes a first chamber S1 and a second chamber S2 in a housing. The first chamber S1 and the second chamber S2 are divided by a vertical wall a1. First, the configuration in the first chamber S1 is explained with reference to FIG. 2.

The printing apparatus 100 includes a paper feeding tray 1, a paper feeding roller 2, sensors S, a plurality of motors M, a plurality of platen rollers PR, a plurality of conveying rollers R, a plurality of pinch rollers P, a first thermal head 3, and a second thermal head 4.

The paper feeding tray 1 is a table for placing sheets 5. In this embodiment, thermal paper is placed on the paper feeding tray 1 as the sheets 5.

The paper feeding roller 2 feeds the sheets 5 (the thermal paper) placed on the paper feeding tray 1 to a conveying path 6 one by one. In the following explanation, a direction in which the sheet 5 is conveyed from the paper feeding roller 2 is referred to as feed direction. Processing for conveying the sheet 5 in the feed direction is referred to as feed.

The sensors S detect presence or absence of the sheet 5. The position of the sheet 5 present in the printing apparatus 100 is detected by the sensors S.

The motors M drive the conveying rollers R. The driven conveying rollers R convey the sheet 5.

The platen rollers PR are driven to rotate by a rotation driving mechanism (not shown in the figure) including a motor (not shown in the figure) such as a stepping motor, a gear, and a belt. The platen rollers PR are disposed to be opposed to the first thermal head 3 included in a printing head 3-1 and the second thermal head 4 included in a printing head 4-1. The platen rollers PR press the sheet 5 such that the sheet 5 is properly conveyed on the conveying path 6. The sheet 5 is conveyed to a discharge port (the discharge port 350 in FIG. 1) along the conveying path 6 by the conveying rollers R and the platen rollers PR. In the following explanation, a mechanism configured by the platen rollers PR, the rotation driving mechanism, and the conveying rollers R is referred to as conveying mechanism (conveying unit).

The printing head 3-1 prints an image on the sheet 5. The printing head 3-1 includes the first thermal head 3.

The thermal head 3 is disposed to be opposed to the platen roller PR above the platen roller PR. The first thermal head 3 prints printing data on the sheet 5 conveyed in the feed direction by the platen rollers PR and the conveying rollers R. The first thermal head 3 is provided to be capable of coming into contact with and separating from the platen roller PR and is urged by an elastic member toward the platen roller R. The first thermal head 3 presses the sheet 5, which is conveyed in the feed direction between the first thermal head 3 and the platen roller PR, against the platen roller PR. The first thermal head 3 includes a plurality of heat generating elements disposed in a row and selectively energizes the plurality of heat generating elements to cause the heat generating elements to generate heat. The first thermal head 3 prints printing data on the sheet 5 with the generated heat of the heat generating elements. In the following explanation, a mechanism configured by the first thermal head 3, the rotation driving mechanism, and the platen roller PR is referred to as printing mechanism.

The printing head 4-1 erases an image printed on the sheet 5. The printing head 4-1 includes the second thermal head 4.

The second thermal head 4 is disposed to be opposed to the platen roller PR above the platen roller PR. The second thermal head 4 erases an image printed on a printed sheet conveyed in an opposite direction (hereinafter referred to as "back-feed direction") of the feed direction by the platen rollers PR and the conveying rollers R. The second thermal head 4 is provided to be capable of coming into contact with and separating from the platen roller PR and is urged by an elastic member toward the platen roller PR. The second thermal head 4 presses the printed sheet, which is conveyed in the back-feed direction between the second thermal head 4 and the platen roller PR, against the platen roller PR. The second thermal head 4 includes a plurality of heat generating elements disposed in a row and selectively energizes the plurality of heat generating elements to cause the heat generating elements to generate heat. The second thermal head 4 erases the image printed on the printed sheet with the generated heat of the heat generating elements. In the following explanation, a mechanism configured by the second thermal head 4, the rotation driving mechanism, and the platen roller PR is referred to as erasing mechanism.

The temperature of the second thermal head 4 is set lower than the temperature of the first thermal head 3. Note that the temperatures of the first thermal head 3 and the second thermal head 4 are controlled by a control device 400.

The pinch rollers P are disposed to be opposed to the conveying rollers R.

The configuration in the second chamber S2 is explained with reference to FIG. 3.

As shown in FIG. 3, the control device 400 and a power supply unit 500 are housed in the second chamber S2.

The control device 400 controls the operation of the entire printing apparatus 100. For example, the control device 400 controls the conveying mechanism, the printing mechanism, and the erasing mechanism. The control device 400 drives the paper feeding roller 2 according to a printing instruction for printing data to convey the sheet 5. The control device 400 controls the first thermal head 3 to print the printing data on the sheet 5. The control device 400 controls the conveying mechanism according to a re-printing instruction to back-feed a printed sheet. The control device 400 controls the second thermal head 4 to erase an image printed on the back-fed printed sheet. Note that, although not shown in FIG. 3, the rotation driving mechanism for driving the conveying mechanism, the printing mechanism, and the erasing mechanism is provided in the second chamber S2.

The power supply unit 500 supplies electric power to the printing apparatus 100. A broken line 23 represents a route through which data passes between the display unit 200 and the control device 400 included in the printing apparatus 100. A broken line 24 represents a route through which data passes between the operation unit 300 and the control device 400.

Instructions input to the display unit 200 and the operation unit 300 are notified to the control device 400.

Figure 4:
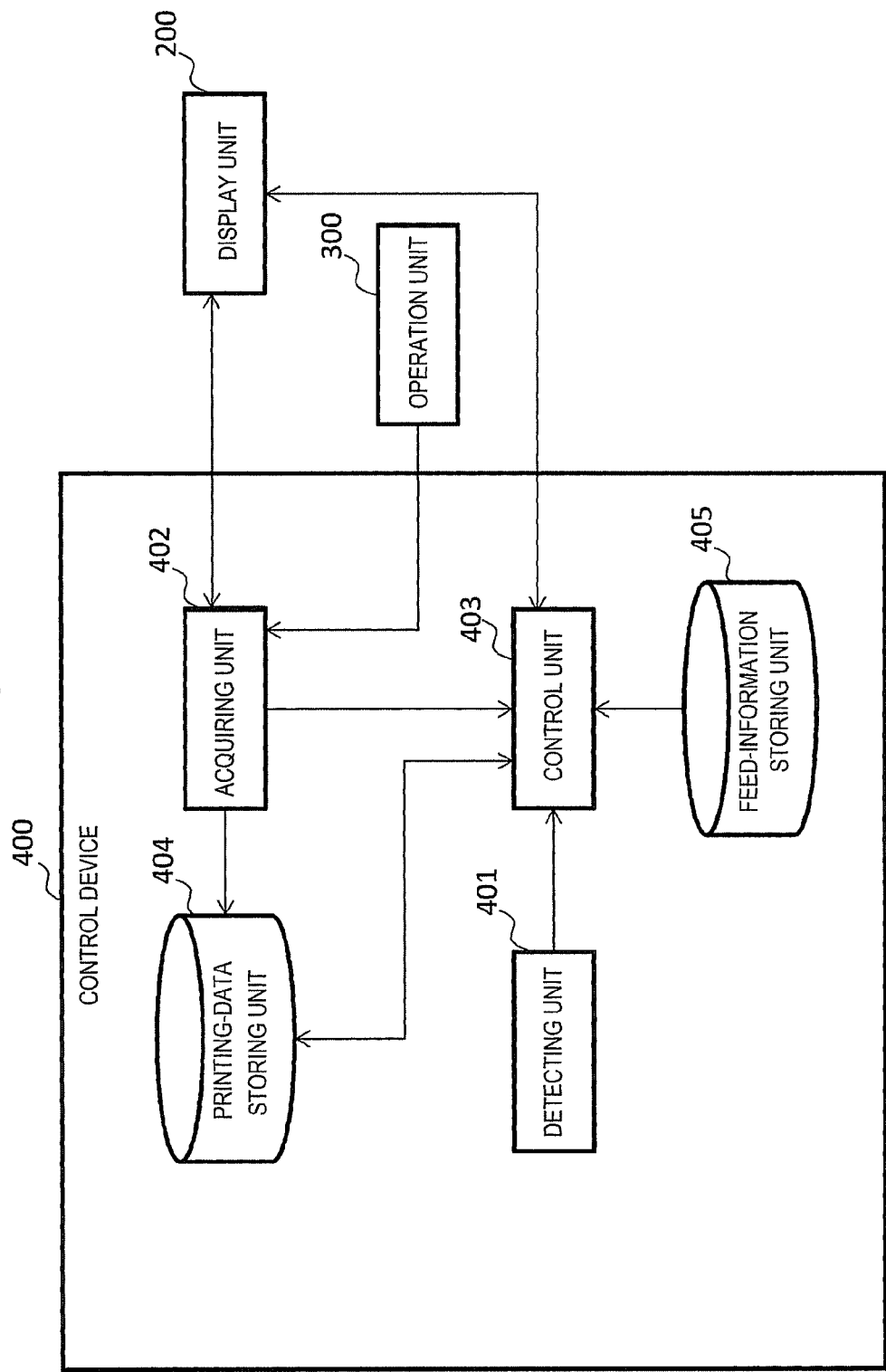
FIG. 4 is a schematic block diagram showing the functional configuration of a control device.

FIG. 4 is a schematic block diagram showing the functional configuration of the control device 400.

The control device 400 includes a CPU (Central Processing Unit), a memory, and an auxiliary storage device connected by a bus and executes a control program. According to the execution of the control program, the control device 400 functions as a device including a detecting unit 401, an acquiring unit 402, a control unit 403, a printing-data storing unit 404, and a feed-information storing unit 405. Note that all or a part of the functions of the control device 400 may be realized using hardware such as an ASIC (Application Specific Integrated Circuit), a PLD (Programmable Logic Device), or an FPGA (Field Programmable Gate Array). The control program may be recorded in a computer-readable recording medium. The computer-readable recording medium is, for example, a portable medium such as a flexible disk, a magneto-optical disk, a ROM, or a CD-ROM or a storage device such as a hard disk incorporated in a computer system. The control program may be transmitted and received via an electric communication line.

The detecting unit 401 detects presence or absence of the sheet 5 and length in the feed direction of the sheet 5 on the basis of a detection result of the sensors S.

The acquiring unit 402 acquires instruction information input to the display unit 200 by the user. The instruction information includes information such as a printing instruction and a re-printing instruction for printing data. The acquiring unit 402 acquires operation information input to the operation unit 300 by the user. The operation information includes information such as a printing instruction and a re-printing instruction for printing data.

The control unit 403 controls the functional units of the control device 400, the conveying mechanism, the printing mechanism, and the erasing mechanism. For example, if printing of printing data is instructed, the control unit 403 drives the paper feeding roller 2 to convey the sheet 5 to the conveying path 6. The control unit 403 controls the printing mechanism to execute printing on the basis of printing data stored in the printing-data storing unit 404. If re-printing is instructed, the control unit 403 rotates the conveying mechanism in the back-feed direction to back-feed a printed sheet. Thereafter, the control unit 403 controls the erasing mechanism to erase an image printed on the printed sheet.

The printing-data storing unit 404 is configured using a storage device such as a magnetic hard disk device or a semiconductor storage device. The printing-data storing unit 404 stores printing data. The printing data stored in the printing-data storing unit 404 is most recent data to be printed during printing.

The feed-information storing unit 405 is configured using a storage device such as a magnetic hard disk device or a semiconductor storage device. The feed-information storing unit 405 stores a feed amount. The feed amount represents a feed amount to the discharge port after the detection of the sheet 5 by the sensors S.

Figure 5:
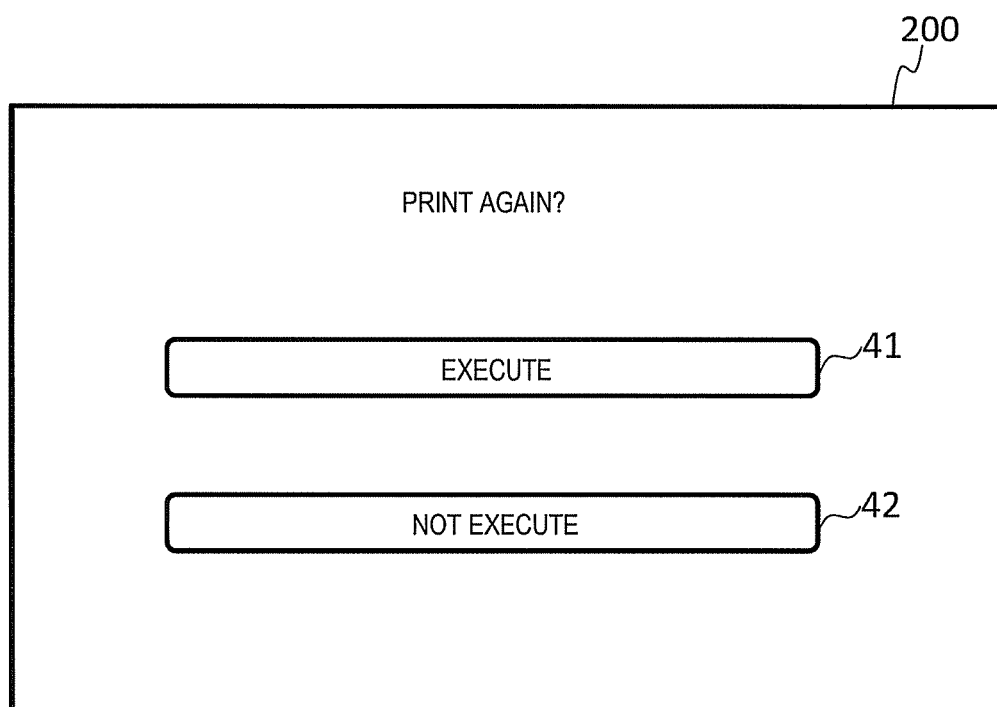
FIG. 5 is a diagram showing a specific example of a selection screen displayed on a display unit.

FIG. 5 is a diagram showing a specific example of a selection screen displayed on the display unit 200.

The selection screen shown in FIG. 5 is displayed on the display unit 200 after the completion of printing of printing data. Specifically, when the printing data is printed, the control unit 403 causes the display unit 200 to display the selection screen.

On the selection screen, a character string representing an instruction to the user and selection buttons 41 and 42 are displayed. In FIG. 5, a character string "print again?" is displayed as a specific example of the character string representing an instruction to the user. The selection buttons are buttons for causing the user to select necessity of re-printing.

The selection button 41 is a button selected if the re-printing is necessary. If the selection button 41 is pressed by the user, the control unit 403 controls the conveying mechanism to back-feed a printed sheet. Further, the control unit 403 controls the temperature of the second thermal head 4 in order to erase an image printed on the printed sheet.

The selection button 42 is a button selected if the re-printing is unnecessary. If the selection button 42 is pressed by the user, the control unit 403 does not control the printing mechanism and the erasing mechanism. In the following explanation, a button (in FIG. 5, the selection button 41) selected if the re-printing is necessary is referred to as re-printing execution button. In the following explanation, a button (in FIG. 5, the selection button 42) selected if the re-printing is unnecessary is referred to as non-execution button.

Figure 6:
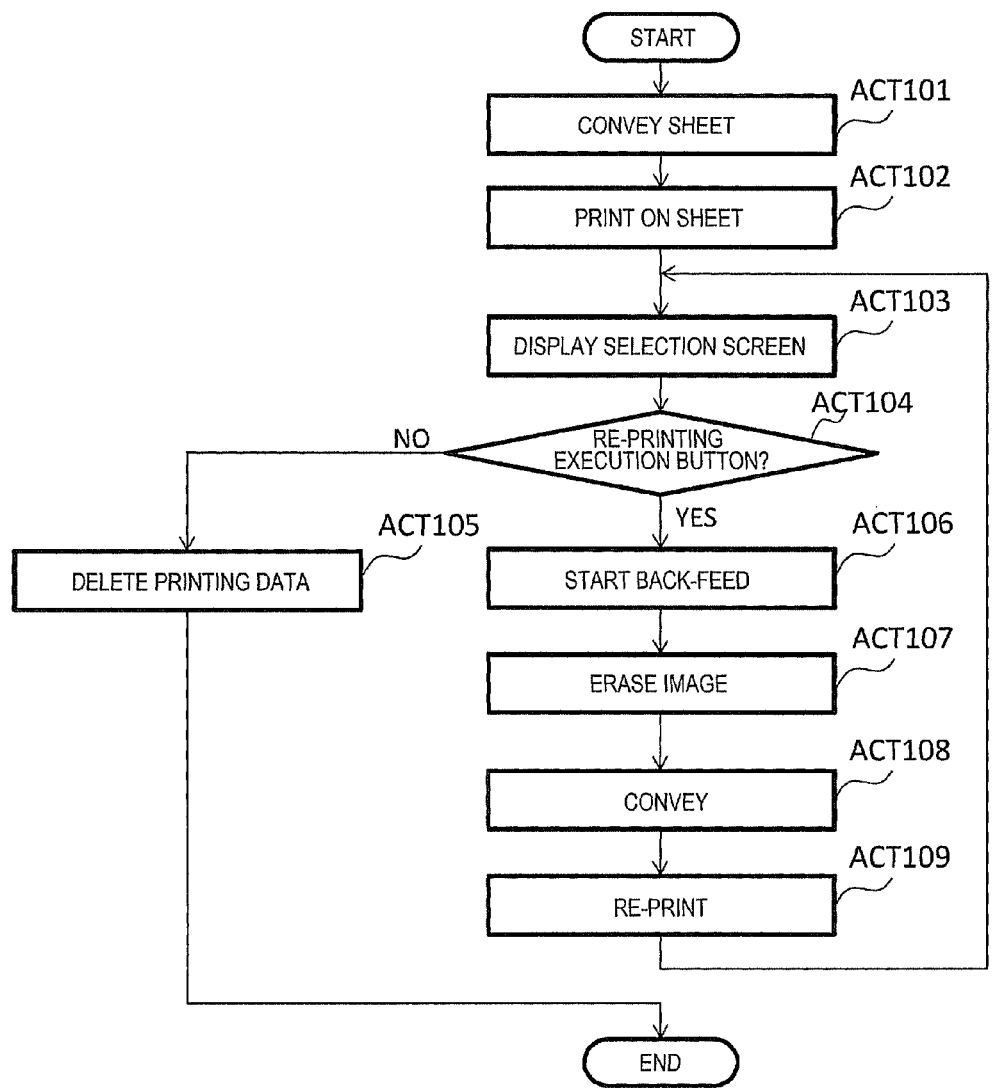
FIG. 6 is a flowchart for explaining a flow of the operation of the printing apparatus.

FIG. 6 is a flowchart for explaining a flow of the operation of the printing apparatus 100. Processing shown in FIG. 6 is started when printing data is generated. The printing data is stored in the printing-data storing unit 404.

First, the control unit 403 controls the paper feeding roller 2 to convey the sheet 5 (ACT 101). If the presence of the sheet 5 is detected by the sensors S, the detecting unit 401 notifies the control unit 403 to that effect. The control unit 403 receives the notification and measures a feed amount of the sheet 5. The control unit 403 controls the printing mechanism to print, on the sheet 5, the printing data stored in the printing-data storing unit 404 (ACT 102). When the printing is completed, the control unit 403 causes the display unit 200 to display the selection screen. The display unit 200 displays the selection screen according to the control by the control unit 403 (ACT 103). The control unit 403 controls the conveying mechanism to convey the printed sheet to the discharge port. The control unit 403 calculates a feed amount and causes the feed-information storing unit 405 to store information concerning the calculated feed amount.

If any one of the selection buttons displayed on the selection screen is pressed by the user, the control unit 403 determines whether the pressed button is the re-printing execution button (ACT 104). If the pressed button is not the re-printing execution button (NO in ACT 104), the control unit 403 determines that the re-printing is unnecessary and does not perform control. Thereafter, the control unit 403 deletes the printing data, printing of which is completed (ACT 105). Thereafter, the processing ends.

If the pressed button is the re-printing execution button (YES in ACT 104), the control unit 403 determines that the re-printing is necessary and starts back-feed (ACT 106). Specifically, the control unit 403 rotates the conveying mechanism in the back-feed direction and performs the back-feed. The control unit 403 executes the back-feed by the feed amount stored in the feed-information storing unit 405.

The control unit 403 controls the erasing mechanism (e.g., the second thermal head 4) to erase the image printed on the printed sheet (ACT 107). When the back-feed is completed by the feed amount, the control unit 403 rotates the conveying mechanism to rotate in the feed direction to convey the sheet 5, from which the image is erased, in the feed direction (ACT 108). The control unit 403 controls the printing mechanism (e.g., the first thermal head 3) to re-print the printing data on the sheet 5 from which the image is erased. The control unit 403 causes the printing mechanism to re-print the printing data stored in the printing-data storing unit 404. The printing data to be re-printed is printing data same as the printing data of the image erased in the processing in ACT 107. The printing mechanism re-prints the printing data according to the control by the control unit 403 (ACT 109). Thereafter, the processing in ACT 103 and subsequent acts is executed.

The printing apparatus 100 configured as explained above can automatically re-print the sheet 5 according to a request of the user. Details of this effect are explained below.

First, when the printing data is generated, the printing apparatus 100 prints the printing data on the sheet 5. Subsequently, after the printing is completed, the printing apparatus 100 causes the user to select necessity of the re-printing. If the user inputs an instruction to the effect that the re-printing is necessary, the printing apparatus 100 executes the back-feed. The printing apparatus 100 controls the erasing mechanism during the back-feed to erase the image printed on the printed sheet. Thereafter, the printing apparatus 100 rotates the conveying mechanism in the feed direction and controls the printing mechanism to re-print the printing data on the sheet from which the image is erased. Therefore, the user does not need to place the sheet 5 on the paper feeding tray 1 again when performing the re-printing. Therefore, it is possible to reduce labor and time required in the re-printing.

In this embodiment, during the back-feed, the printing apparatus 100 erases the image printed on the printed sheet. During the feed, the printing apparatus 100 re-prints the printing data on the sheet 5 from which the image is erased. Therefore, a predetermined time is provided between the erasing of the image and the re-printing. Therefore, the temperature of the sheet after the erasing of the image is close to the normal temperature. It is possible to improve image quality and accuracy of printing when the re-printing is performed.

A modification of the printing apparatus 100 and the control apparatus 400 is explained.

Figure 7:
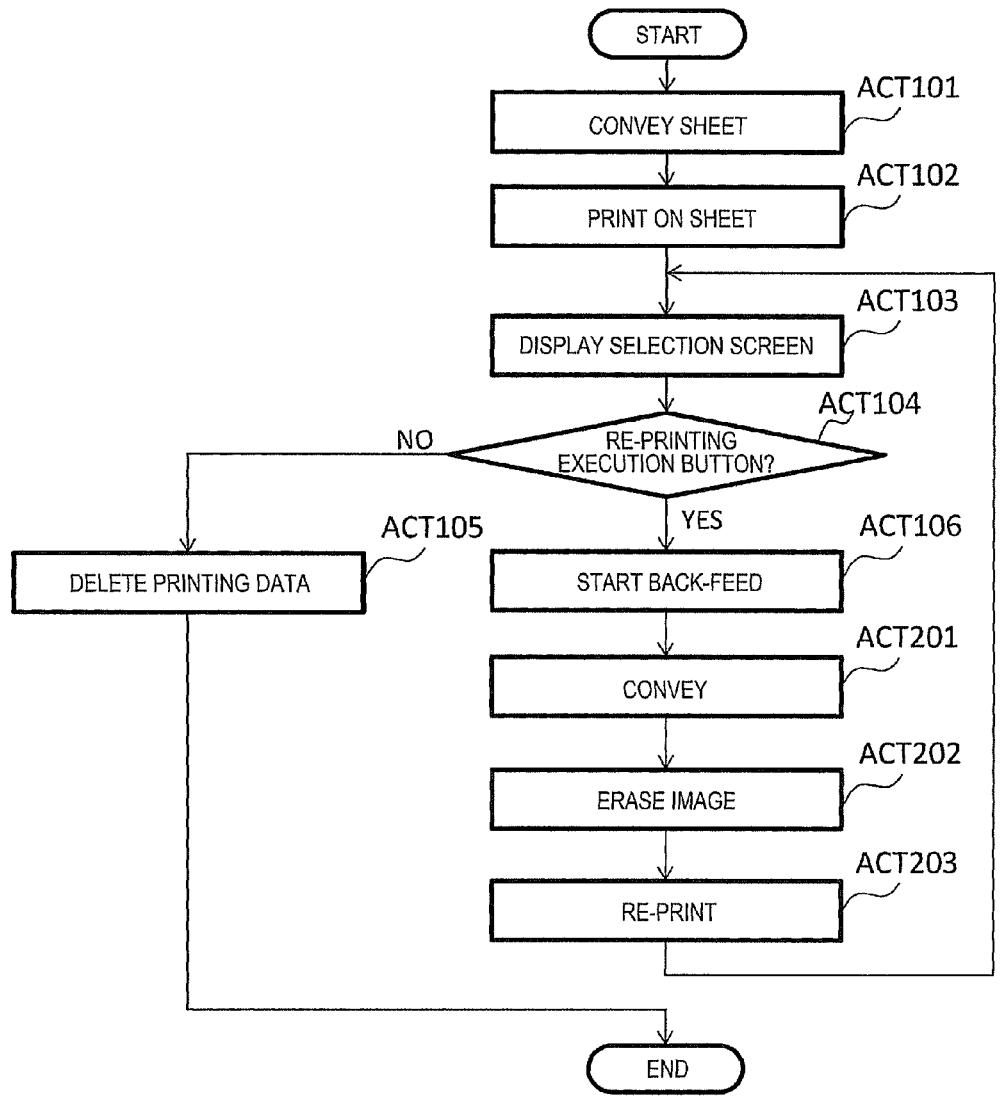
FIG. 7 is a flowchart for explaining a flow of the operation of the printing apparatus in a modification.

In this embodiment, the erasing of the image and the re-printing are performed in the different conveying directions (the feed direction and the back-feed direction). However, the erasing of the image and the re-printing are not limited to this. For example, the printing apparatus 100 may be configured to perform the erasing of the image and the re-printing during the feed after the re-printing is instructed. When the printing apparatus 100 is configured in this way, processing explained below is performed. The processing is specifically explained with reference to FIG. 7. FIG. 7 is a flowchart for explaining a flow of the operation of the printing apparatus 100 in the modification. In FIG. 7, note that acts same as the acts in FIG. 6 are denoted by reference signs same as the reference signs in FIG. 6 and explanation of the acts is omitted.

When the processing up to ACT 106 is completed, processing explained below is performed. When the back-feed is completed by the feed amount, the control unit 403 rotates the conveying mechanism in the feed direction to convey the printed sheet in the feed direction (ACT 201). The control unit 403 controls the erasing mechanism (e.g., the second thermal head 4) to erase the image printed on the printed sheet (ACT 202). Thereafter, the control unit 403 controls the printing mechanism (e.g., the first thermal head 3) to re-print the printing data on the sheet 5 from which the image is erased. The control unit 403 causes the printing mechanism to re-print the printing data stored in the printing-data storing unit 404. The printing data to be re-printed is printing data same as the printing data of the image erased in the processing in ACT 202. The printing mechanism re-prints the printing data according to the control by the control unit 403 (ACT 203). Thereafter, the processing in ACT 103 and subsequent acts is executed.

In the example explained in this embodiment, the printing mechanism and the erasing mechanism are configured by separate devices. However, the printing mechanism and the erasing mechanism may be realized by one device.

In this embodiment, the thermal cut paper is used. However, the printing apparatus 100 in this embodiment can also be applied to thermal roll paper.

Roller pairs (the pinch rollers P and the conveying rollers R) included in the printing apparatus 100 do not need to be limited to the number shown in FIG. 2. For example, the number of the roller pairs included in the printing apparatus 100 may be larger than the number shown in FIG. 2 or may be smaller than the number shown in FIG. 2. A disposition relation between the conveying rollers R and the pinch rollers P indicated by the roller pairs does not need to be limited to the disposition relation shown in FIG. 2. For example, the pinch rollers P may be disposed to be opposed to the conveying rollers R above the conveying rollers R. The conveying rollers R may be disposed to be opposed to the pinch rollers P below the pinch rollers P.

If there is no input from the user even when a predetermined time elapses after the display of the selection screen shown in FIG. 5, the control unit 403 may regard that the non-execution button is pressed.

According to at least one embodiment explained above, the printing apparatus includes the conveying unit configured to convey a sheet, the printing unit configured to print an image on the conveyed sheet, the display unit configured to perform display for causing a user to select necessity of re-printing on the sheet on which the image is printed, and the control unit configured to control, if the necessity of the re-printing of the sheet is selected, the conveying unit to back-feed the sheet and controls the printing unit to perform re-printing. Consequently, it is possible to reduce labor and time required in the re-printing.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and there equivalents are intended to cover such forms or modifications as would fall within the scope and spirit of the invention.

What is claimed is:

1. A printing apparatus comprising:
   a conveying unit configured to convey a sheet;
   a printing unit configured to print an image on the sheet conveyed by the conveying unit;
   an erasing unit configured to erase the image printed on the sheet;
   a display unit configured to display a selection screen every time after completion of printing or re-printing of printing data, the selection screen allowing a user to select either one of first and second options; and
   a control unit configured to recognize a selected one of the first and second options, the control unit being configured to control the conveying unit to discharge the sheet if the control unit recognized that the first option is selected, the control unit being configured, if the control unit recognized that the second option is selected, to:
   control the conveying unit to back-feed the sheet;
   control the erasing unit to erase all of the image printed on the sheet; and
   control the printing unit to perform re-printing, after the back-feed of the sheet is completed, the image on the sheet, using all of the same image data as the image data last-used to have printed the image on the sheet.

2. The apparatus according to claim 1, further comprising a first storing unit configured to store the image printed on the sheet, wherein
   the printing unit re-prints, on the sheet, the image stored in the first storing unit.

3. The apparatus according to claim 1, wherein
   during the back-feed, the erasing unit erases the image printed on the sheet.

4. The apparatus according to claim 3, wherein
   after the back-feed is completed, the control unit conveys the sheet, from which the image is erased, in an opposite direction of a direction in which the sheet is conveyed during the back-feed, and
   the printing unit re-prints the sheet from which the image is erased.

5. The apparatus according to claim 1, wherein
   after the back-feed is completed, the erasing unit erases the image printed on the sheet.

6. The apparatus according to claim 5, wherein
   after the back-feed is completed, the control unit conveys the sheet in an opposite direction of a direction in which the sheet is conveyed during the back-feed,
   after the back-feed is completed, the erasing unit erases the image printed on the sheet conveyed to the erasing unit, and
   the printing unit re-prints the sheet from which the image is erased.

7. The apparatus according to claim 1, wherein the display unit displays a plurality of buttons for selecting necessity of re-printing on the sheet.

8. A printing method comprising:
   conveying a sheet;
   printing an image on the sheet conveyed;
   erasing the image printed on the sheet;
   displaying a selection screen every time after completion of printing or re-printing of printing data, the selection screen allowing a user to select either one of first and second options;
   recognizing a selected one of the first and second options;

discharging the sheet if recognized that the first option is selected, wherein conveying the sheet comprises back-feeding the sheet if it is recognized that the second option is selected, wherein erasing the image comprises erasing all of the image printed on the sheet if it is recognized that the second option is selected, and wherein printing the image on the sheet comprises re-printing, after the back-feed of the sheet is completed, the image on the sheet, using all of the same image data as the image data last-used to have printed the image on the sheet if it is recognized that the second option is selected.

9. A non-transitory recording medium having recorded therein a computer program to be executed by a computer included in a printing apparatus for causing the printing apparatus to execute:

conveying a sheet in a conveying path;

printing an image on the sheet conveyed;

erasing the image printed on the sheet;

displaying a selection screen every time after completion of printing or re-printing of printing data, the selection screen allowing a user to select either one of first and second options;

recognizing a selected one of the first and second options;

discharging the sheet if recognized that the first option is selected, wherein conveying the sheet comprises back-feeding the sheet if it is recognized that the second option is selected, wherein erasing the image comprises erasing all of the image printed on the sheet if it is recognized that the second option is selected, and wherein printing the image on the sheet comprises re-printing, after the back-feed of the sheet is completed, the image on the sheet, using all of the same image data as the image data last-used to have printed the image on the sheet if it is recognized that the second option is selected.

\* \* \* \* \*

UNITED STATES PATENT AND TRADEMARK OFFICE
CERTIFICATE OF CORRECTION

PATENT NO. : 9,665,811 B2
APPLICATION NO. : 14/680198
DATED : May 30, 2017
INVENTOR(S) : Hamanaka It is certified that error appears in the above-identified patent and that said Letters Patent is hereby corrected as shown below:

On the Title Page

In the First Column, Item (73), the Assignee, is listed as:
KABUSHIKI KAISHA TOSHIBA, Tokyo (JP); TOSHIBA TEC KABUSHIKI KAISHA, Tokyo (JP)

It should read:
TOSHIBA TEC KABUSHIKI KAISHA, Tokyo (JP)

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*